United States Patent [19]
Fleuchaus

[11] Patent Number: 5,941,326
[45] Date of Patent: Aug. 24, 1999

[54] GUIDE RAIL FOR A CRAWLER TRACK

[75] Inventor: James S. Fleuchaus, Butler, Wis.

[73] Assignee: Harnischfeger Technologies, Inc., Wilmington, Del.

[21] Appl. No.: 08/743,606

[22] Filed: Nov. 4, 1996

[51] Int. Cl.⁶ ................................................ B62D 55/10
[52] U.S. Cl. ......................... 180/9.1; 305/120; 305/139
[58] Field of Search ........................... 180/9.1; 280/28.5; 305/116, 120, 124, 127, 139

[56] References Cited

U.S. PATENT DOCUMENTS

| | | | |
|---|---|---|---|
| 1,660,101 | 2/1928 | Smyth | 305/139 |
| 4,402,555 | 9/1983 | Ogaki et al. | 305/120 X |
| 5,096,270 | 3/1992 | Oilund et al. | 180/9.1 X |

*Primary Examiner*—Kevin Hurley
*Assistant Examiner*—William R. Zimmerli
*Attorney, Agent, or Firm*—Richard C. Ruppin; James Earl Lowe, Jr.

[57] ABSTRACT

A crawler track guide rail having an upper elongated surface engagable with the shoes of a crawler track, a lower surface engagable with a crawler track support frame, and a foot which extends downward into the frame to transfer load resulting from the engagement of the shoes with the guide rail to the frame. The guide rail has at least one elongated lower surface and may have two elongated lower surfaces which are engageable with the frame. Where there are two elongated surfaces of the guide rail in engagement with the frame, the foot of the guide rail is positioned between the two elongated surfaces. The guide rail has a plurality of fasteners for retaining it on the crawler frame extending through the guide rail and the frame The fasteners have a selected tolerance fit with the frame and the foot of the guide rail has a smaller tolerance fit with the frame than that of the fasteners. Thus, the foot fits relatively snugly with the frame to thereby assist with transfer of the load on the guide rail to the frame through the foot rather than through the fastener members.

15 Claims, 3 Drawing Sheets

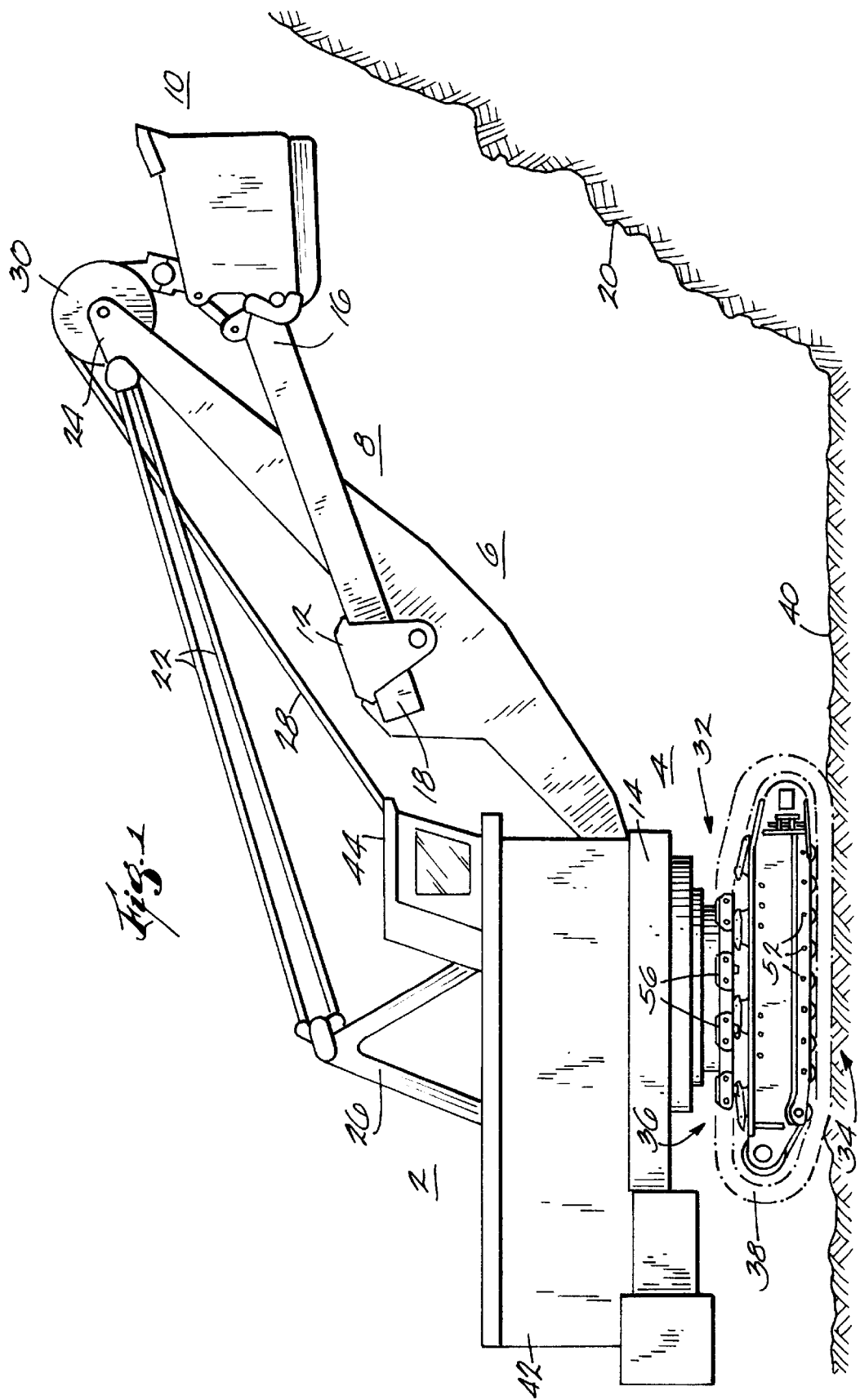

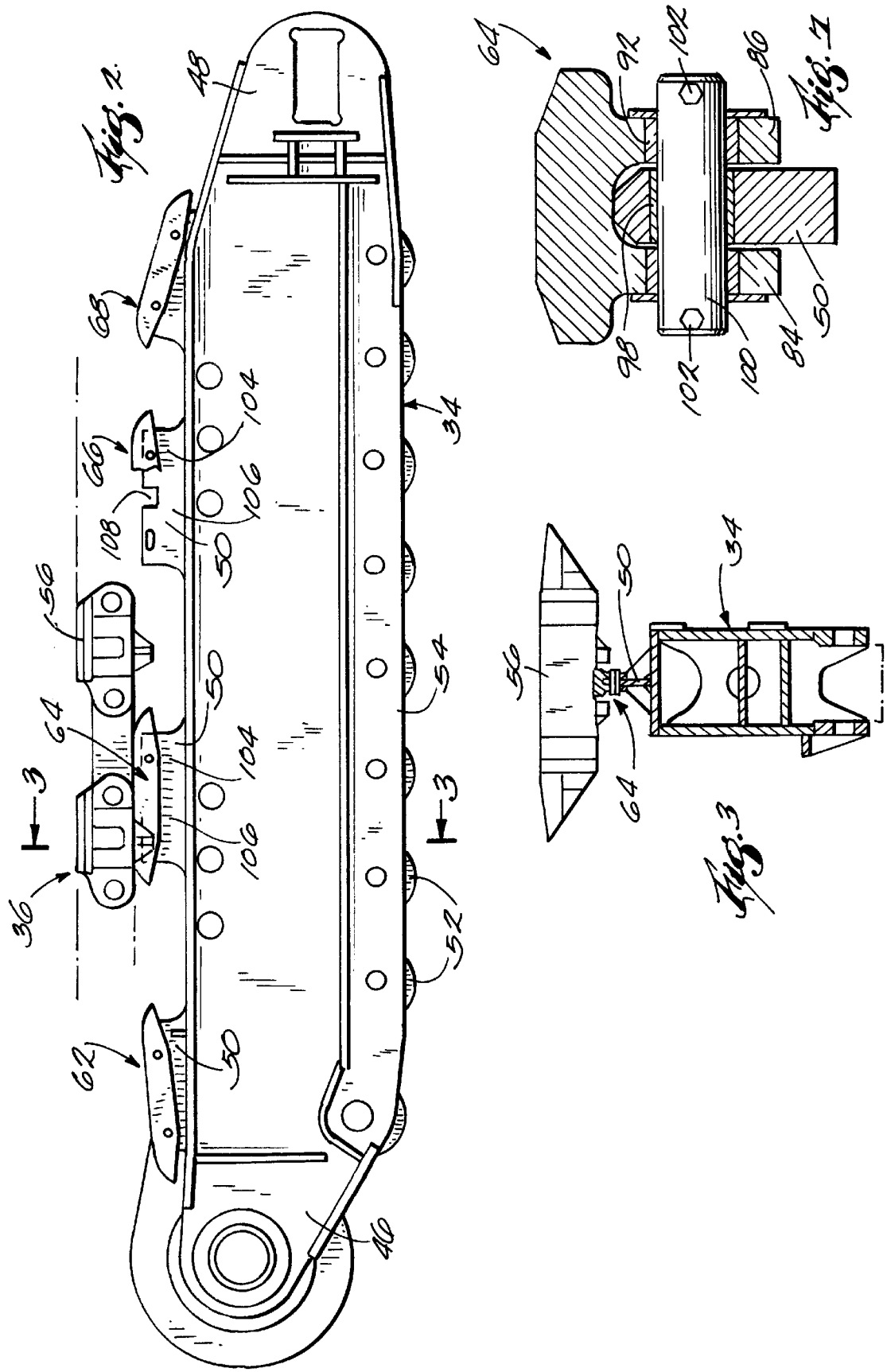

GUIDE RAIL FOR A CRAWLER TRACK

FIELD OF THE INVENTION

This invention relates to vehicles driven by ground engaging crawler tracks and, more particularly, the invention is directed to a guide rail for supporting a crawler track.

BACKGROUND OF THE INVENTION

In vehicles driven by endless crawler tracks such as surface mining shovels, excavators, bulldozers and tankes the crawler tracks include a series of shoes which are pivotally pinned together and driven by a tumbler drive mechanism to move the vehicle along a ground surface. In moving the vehicle along the ground surface, the crawler track moves over the ground and around end supports and along a path above the ground surface that is substantially horizontal or which may have a slight curvature In its movement along the horizontal path, the shoes of the crawler track slide over supporting guide rails as the track moves to or from the drive mechanism. Due to the sliding engagement of the shoes with the guide rails and the abrasive nature of the movement due to the constant presence of dirt on the shoes, the guide rails have a relatively high wear rate and must be replaced quite often. Since the guide rails are an integral part of the crawler track support frame, they must be removed by an arc cutting means. Few guide rails must then be welded in place. The removal and replacement of the guide rails obviously is a time consuming and costly operation. Further, the guide rails, as part of the crawler track support frame, require extensive fabrication which makes them a very costly component.

SUMMARY OF THE INVENTION

It is an object of the present invention to provide a guide rail for support of a crawler track which can be easily and readily removed from the crawler track supporting frame. A further object of the invention is to provide a readily removable guide rail for a crawler track which transfers the load from the crawler track on the guide rails directly to the crawler frame without placing any significant load on the mechanism for attaching the guide rail to the crawler frame.

The invention is accomplished by providing a guide rail having an upper elongated surface engagable with the shoes of a crawler track and, a lower surface engagable with a crawler track support frame. A foot of the guide rail extends downward into the frame to transfer load from the shoes in engagement with the guide rail to the frame. The guide rail has at least one elongated lower surface and may have two elongated lower surfaces which are engageable with the frame. Where there are two elongated surfaces of the guide rail in engagement with the frame, the foot of the guide rail is positioned between the two elongated surfaces. The guide rail has a plurality of fasteners for retaining it on the crawler frame, the fasteners have an elongated length extending through openings in the guide rail and the frame. The fastener member has a selected tolerance fit with the frame and the foot of the guide rail has a smaller tolerance fit with the frame than that of the fastener member such that the foot fits relatively snugly with the frame to thereby assist with transfer of the load on the guide rail to the frame through the foot rather than through the fastener member. The openings in the guide rail are elongated in a substantially vertical direction and the openings in the crawler frame are elongated in a substantially horizontal direction. The fastener members preferably are pins which move relatively freely through the guide rail and the crawler frame.

The crawler frame includes an upwardly extending wall having an opening into which the foot of the guide rail extends The crawler frame wall comprises an upright wall member which extends upward and is received in a pair of slots in the guide rail. The guide rail may have downwardly extending skirts forming side rails of the slots and the pins retaining the guide rail on the crawler frame extend through the side walls of the slots and the crawler frame wall member. The pins have a larger or looser tolerance fit with the side walls of the guide rail and the crawler frame than the tolerance fit of the foot which extends into the wall member.

BRIEF DESCRIPTION OF THE DRAWINGS

Further objects and advantages of the invention will appear when taken in conjunction with the accompanying drawings, in which:

FIG. 1 is a side elevation view of a surface lining shovel incorporating the instant invention;

FIG. 2 is a side elevation view of the crawler frame comprising part of the shovel shown in FIG. 1 with a portion of a crawler track supported on the crawler frame;

FIG. 3 is a cross-sectional view taken along lines 3—3 in FIG. 2;

FIG. 7 is a cross-sectional view taken-along lines 7—7 in FIG. 6.

DETAILED DESCRIPTION OF THE INVENTION

Figure 4:
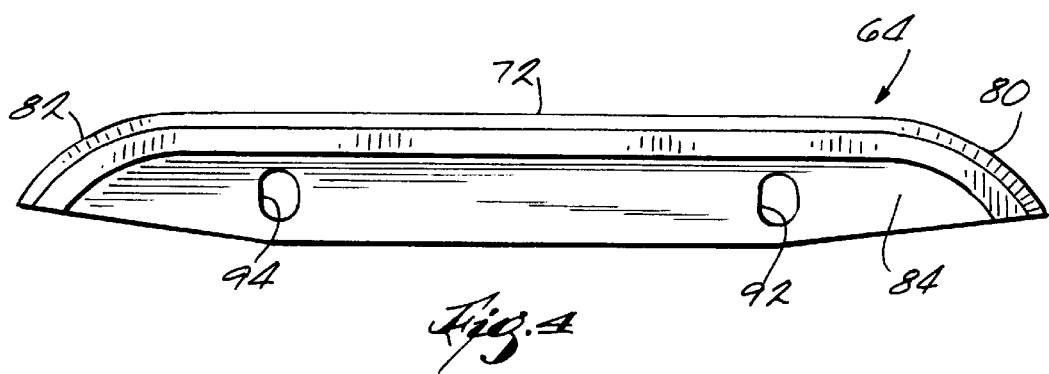
FIG. 4 is a side elevation view of the guide rail according to the invention.
Figure 5:
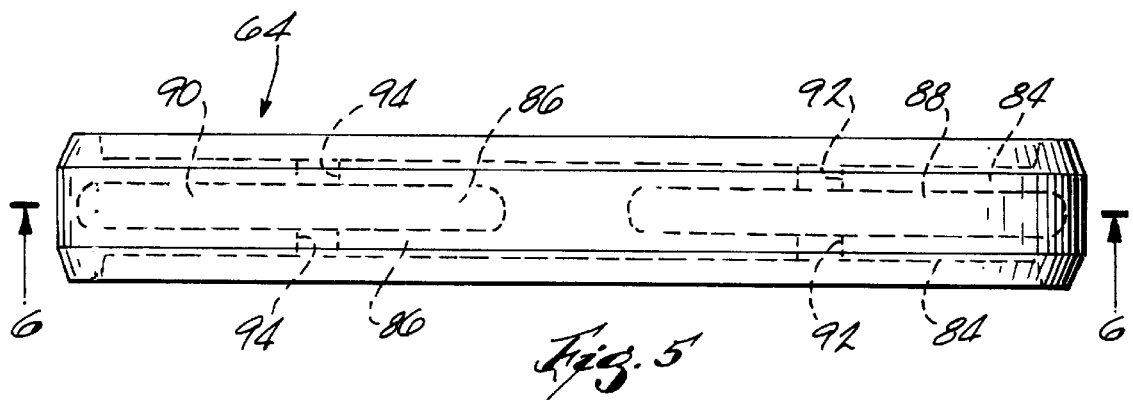
FIG. 5 is a plan view of the guide rail shown in FIG. 4.

Referring generally to the drawings, a surface mining shovel is shown as having an upper assembly 2 including a machinery house 42, a lower assembly 4, a boom 6 pivotally attached to the front end 14 of the upper assembly 2 a handle 8 having a dipper 10 mounted on its outward end 16 and supported on a crowd mechanism 12 at its inward end 18. The crowd mechanism 12 is pivotally mounted on the boom 6 such that the handle 8 and dipper 10 can be raised and lowered. The crowd mechanism functions to advance the handle and thereby the dipper 10 into ground material 20 to be dug. The boom 6 is supported at an angle extending upward from the upper assembly 2 by a pair of ropes 22 which are anchored to the boom point 24 and extend downward to a gantry 26 comprising part of the upper assembly 2. The dipper 10 and handle 8 are raised and lowered by a pair of ropes 28 attached to the dipper and reeved over sheaves 30 on the boom point 24 and extending downward to a drum mechanism (not shown) in the machinery house 42 which can be controlled to pay out or take in the ropes 28 to raise and lower the dipper.

With reference to FIGS. 1–3 of the drawings, the lower assembly 4 includes a car body 32, a crawler frame 34, a crawler track 36 and a propel drive 38 for driving the crawler to permit movement of the shovel along the ground surface 40. The upper assembly 2 is mounted for swinging or rotating movement on the lower assembly 4, and includes, in addition to the machinery house 42 and gantry 26, an operator's cab 44 mounted on top of the machinery house 42. Referring now to FIG. 2, the crawler frame 34 includes a rear-end 46 on which the propel drive 38 is mounted, a front-end 48 around which the crawler track 36 slides, and upwardly extending wall sections 50. A series of rotatable rollers 52 engaging the crawler track 36 are mounted along a lower edge 54 of the crawler frame. The crawler track 36 is comprised of a series of crawler shoes 56 pivotally connected together.

Guide rails 62, 64, 66, and 68 are mounted on the upwardly extending wall sections 50 for slidably supporting the crawler track 36 as it moves about the crawler frame 34 in response to the driving force of the propel drive 38.

The guide rails 62, 64, 66, and 68 are identical or similar to each other and consequently only one guide rail 64 will be described herein in detail. The guide rail 64 has an elongated shape with a length in the direction of movement of the crawler track 36 and includes an elongated upper surface 72 engageable in a sliding manner with the crawler shoes 56 when the guide rail 64 is mounted on the crawler frame and the crawler track is sliding along the surface 72. The guide rail 64 also has lower elongated surfaces 74, 76 and a downwardly extending foot member 78. Opposite ends 80 and 82 of the elongated surface 72 slope downward and extend over a wall section 50 of the crawler frame when the guide rail 64 is mounted on the crawler frame. The guide rail further includes side skirts 84 and 86 which, between the foot member 78 and the elongated lower surfaces 74 and 76, define elongated slots 88 and 90. Retaining openings 92 and 94 which have a substantially vertically elongated shape respectively extend through skirts 84 and 86 and through openings 96 or 98 in an upwardly extending wall section 50 of the crawler frame to retain the guide rail 64 on the crawler frame. The openings 96 and 98 each have a substantially horizontal elongated shape, as shown in FIG. 7. As shown in FIG. 7, a pin 100 extends through the skirt openings 92 or 94 and the openings 96 or 98 to retain the guide rail 64 on the wall 50. A retaining bolt and nut 102 are extended through the opposite ends of the pins 100 to retain the pins in place in position through the skirts 84, 86 and the wall 50.

Figure 6:
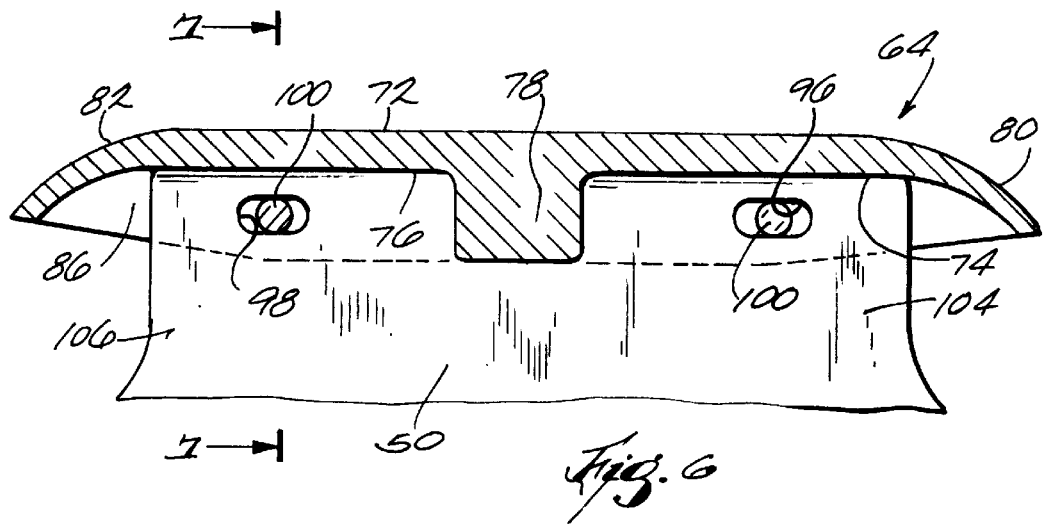
FIG. 6 is a cross-sectional view taken along lines 6—6 of FIG. 5.

The slots 88 and 90 of the guide rail 64 are substantially aligned in their elongated or lengthwise direction and the foot member 78 is positioned between the slots. The wall sections 50 have two members 104 and 106 which extend upward into the slots 88 and 90 of the guide rails and engage the elongated lower surfaces 74 and 76 along their lengths. As shown in FIGS. 2 and 6, the wall members 104 and 106 form an opening 108 into which the foot member 78 of the guide rail extends In particular with reference to FIG. 6, the foot member 78 and opening 108 have a relatively close tolerance fit. All of the load on the guide rail 64 due to the lateral and lengthwise forces of the crawler track 36 as it slides along the upper surface 72 is transferred to the wall section 50 of the crawler frame through the foot member 78 extending into the opening 108 and through the support of the guide rail 64 by the engagement of the wall members 104 and 106 with the lower surfaces 74 and 76 of the guide rail 64. This is the case because the tolerance of the fits between the pins 100 and the openings 92, 94 in the guide rail 64 and the openings 96 or 98 in the wall section 50 are both greater than the tolerance of the fit between the foot members 78 and the openings 108 formed by the wall members 104 and 106. Thus any movement of the guide rails due to load on them is transferred to the wall 50 before any load can be transferred through the pins 100 to the wall 50. Consequently, wear and distortion of the attachment mechanism for the guide rails including the openings through the wall 50 are minimized enabling easy replacement of the guide rails when necessary.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. A guide rail mounted on a frame for supporting crawler shoes slidably movable over the guide rail comprising:

an upper elongated surface for sliding engagement with the crawler shoes;

a lower surface engageable with the frame; and a foot adapted to extend downward into an opening in the frame, the opening being enclosed in both the forward and rearward direction of crawler shoe travel, for transferring load on the guide rail to the frame.

2. The guide rail in accord with claim 1 wherein the guide rail has at least one elongated lower surface having a length engageable with the frame.

3. The guide rail in accord with claim 1 wherein:

the guide rail has two elongated lower surfaces in substantial, lengthwise alignment with each other and each have a length engageable with the frame; and the foot is positioned between the two elongated surfaces.

4. The guide rail in accord with claim 1 further comprising a plurality of fastener means for retaining the guide rail on the frame.

5. The guide rail in accord with claim 4 wherein each of the fastener means comprises an elongated member extending through the guide rail and the frame.

6. The guide rail in accord with claim 5 wherein:

the foot has a first tolerance fit with the frame; and each elongated member has a second tolerance fit with the frame, the second tolerance fit being larger than the first tolerance fit.

7. The guide rail in accord with claim 6 wherein each elongated member comprises a pin.

8. The guide rail in accord with claim 1 wherein:

the guide rail has two downward facing elongated slots in substantial lengthwise alignment with each other; and the foot comprises an extension of the guide rail between the two elongated slots.

9. The guide rail in accord with claim 8 wherein the slots receive the frame and each slot has an upper surface engaging the frame.

10. A crawler shoe support for slidably moving crawler shoes comprising:

a crawler frame including an upwardly extending wall having an upwardly facing opening, the opening being enclosed within the wall in both the forward and rearward direction of crawler shoe travel; and a crawler shoe guide rail supporting the crawler shoes, the guide rail being positioned above and in engagement with the wall and having a foot extending into the opening whereby the load of the crawler shoes on the guide rail is transferred to the frame.

11. The crawler shoe support in accord with claim 10 wherein;

the wall of the crawler frame comprises a pair of spaced apart upwardly extending flat wall members; and the guide rail has a pair of slots each receiving one of the wall members.

12. The crawler shoe support in accord with claim 11 wherein:

the guide rail has downwardly extending skirts forming two side walls of each of the pair of slots; and at least one pin extending through the two side walls of each slot and the wall member received in such slot whereby the guide rail is retained on the wall members of the crawler frame.

13. The crawler shoe support in accord with claim 12 wherein:

the foot extends between and has a first tolerance fit with the wall members of the crawler frame; and each pin has a second tolerance fit with the side walls of the slot and the wall member of the crawler frame through which the pin extends, the second tolerance fit being larger than the first tolerance fit.

14. The crawler shoe support in accord with claim 13 wherein:

the pair of flat wall members of the wall of the crawler frame have an elongated shape and are aligned in their elongated directions; and the pair of slots of the guide rail have an elongated shape and are aligned in their elongated directions.

15. The crawler shoe support in accord with claim 13 wherein the guide rail has an upper crawler shoe engaging surface, said surface having downward sloping opposite ends positioned above the crawler frame.

\* \* \* \* \*